United States Patent

[11] 3,585,743

[72] Inventor Carl H. Jeffers
 1021 W. Main St., Louisville, Ohio 44641
[21] Appl. No. 6,526
[22] Filed Jan. 28, 1970
[45] Patented June 22, 1971

[54] LICENSE TAG AND IDENTIFICATION HOLDER FOR DOG COLLAR
 6 Claims, 4 Drawing Figs.
[52] U.S. Cl. .................................................... 40/21
[51] Int. Cl. ..................................................... G09f 3/14
[50] Field of Search ........................................ 40/10, 21, 21 C, 19

[56] References Cited
UNITED STATES PATENTS

| 449,951 | 4/1891 | Schwartz | 40/21 |
|---|---|---|---|
| 1,539,744 | 5/1925 | Kelly | 40/21 X |
| 1,540,455 | 6/1925 | Beck | 40/21 |
| 2,680,315 | 6/1954 | McHugh et al. | 40/21 |

Primary Examiner—Robert W. Michell
Assistant Examiner—Winceslao J. Contreras
Attorney—Oldham & Oldham ABSTRACT: A holder for a license tag and identifying data such as the owner's name and address which is easily installed on a dog collar without the need for modifying the collar in any way. A pair of U-shaped members are provided, the lower portion of one of these members having its opposite edges bent to form channels into which the lower portion of the other member is slideably received. The upper surface of each of the U-shaped members is provided with a pair of elongated slot spaced a distance equal to the mounting holes of the license tag. A flat rectangular plate fits within the U-shaped members and has a pair of threaded bosses which project upwardly through the slots. Screws are received in these bosses to clamp a license tag to the holder and to clamp the U-shaped members and the flat plate securely together. The screws have pointed lower ends which bite into the leather of the collar to prevent the holder from sliding. The side edges of the U-shaped members may be provided with tabs which are bent to hold printed identifying material.

PATENTED JUN22 1971 3,585,743
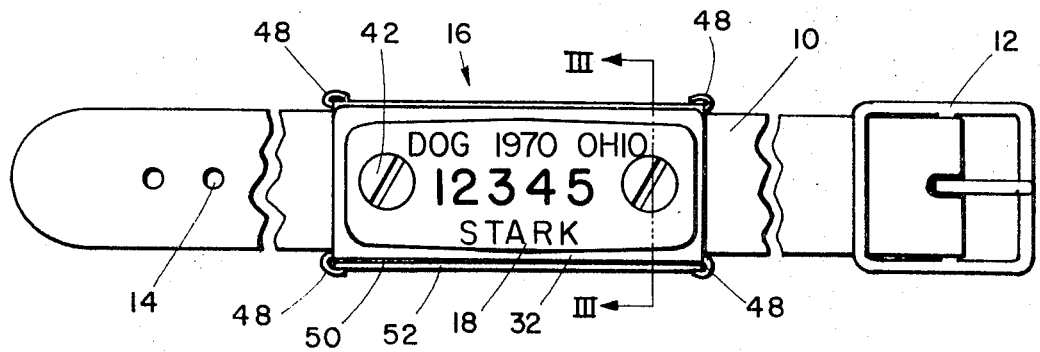
FIG. 1
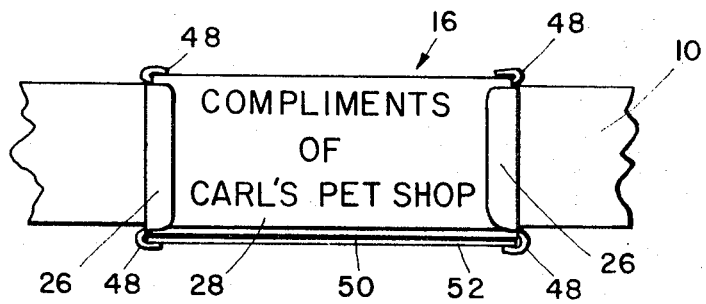
FIG. 2
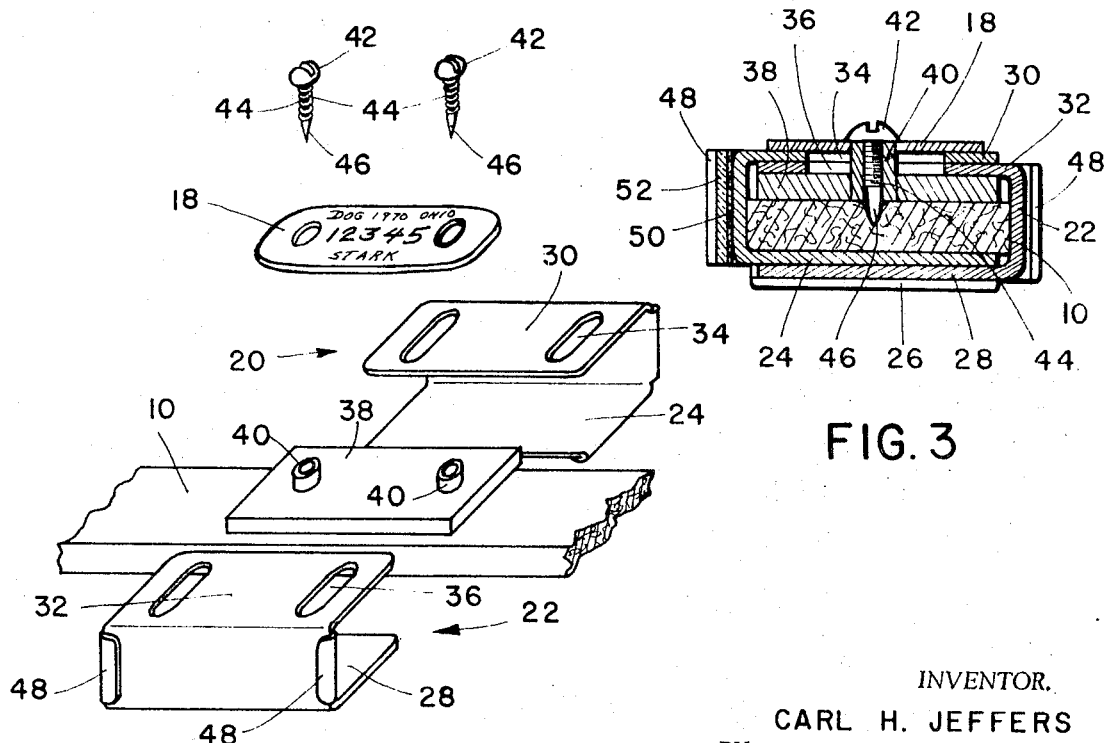
FIG. 3
FIG. 4
INVENTOR.
CARL H. JEFFERS
BY
Oldham & Oldham
ATTORNEYS

LICENSE TAG AND IDENTIFICATION HOLDER FOR DOG COLLAR

This invention relates to a holder for a dog license and other identifying data and more particularly to such a holder which may be readily installed on a dog collar.

In many localities it is required that all dogs must be licensed and that a license tag must be worn by the dog. These tags are normally in the form of small metal plates embossed with a license number. A number of different methods are employed for securing these licensing tags, for example, the tag may be secured by means of a wire link passing through one of the holes in the tag and secured to a ring on the collar. With this arrangement, however, the tag frequently becomes loosened or lost. Another method for securing the tag to the collar is to rivet or bolt the tag but this method requires the punching of holes through the leather of the collar thus weakening the collar.

It is the primary object of my invention to provide a holder which may be used to secure a license tag to a dog collar which is capable of holding the tag securely and which does not require the punching of holes in the collar or any other modification thereto. This is accomplished in my invention by providing a holder which is easily clamped to the collar and to which the license tag may be readily affixed.

Another object of my invention is the provision of a license tag holder which may also be used to provide additional information such as the owner's name and address. The holder of the present invention is thus provided with clips for securing printed identification and may also have data printed or embossed on its various surfaces.

A further object of the present invention is the provision of an identification holder which may be readily adjusted for use on dog collars of different sizes. To accomplish this objective, the holder of my invention is adjustable to tightly fit collars of different widths and thicknesses.

The above and other objects and advantages of the invention will become apparent upon consideration of the following specification and the accompanying drawing wherein there is shown a preferred embodiment of the invention.

In the drawing:

FIG. 1 is a plan view showing the license tag and identification holder of my invention fastened to a dog collar;

FIG. 2 is a bottom plan view of the tag and identification holder;

FIG. 3 is a sectional view taken along the line III–III of FIG. 1; and

FIG. 4 is an exploded view of the license tag and identification holder showing a relationship of the various components.

In FIG. 1 there is shown a dog collar consisting of a leather strap 10 having a buckle 12 at one end and a series of spaced holes 14 at the opposite end. The license tag and identification holder 16, described more fully below, is attached to an intermediate portion of the strap 10 and mounts the dog license tag 18 on its face.

As seen in FIGS. 3 and 4, the identification holder 16 has a pair of generally U-shaped members 20 and 22. The lower portion 24 of the member 20 is provided along opposite sides with downwardly and inwardly turned tabs 26 forming channels which receive opposite edges of the lower portion 28 of the member 22. The upper portion 30 of the member 20 and the upper portion 32 of the member 22 are each provided with a pair of elongated slots 34 and 36, respectively. These slots are preferably separated by a distance equal to the separation between the mounting holes of a standard dog license tag. In Ohio, for example, dog licenses have a pair of mounting holes one and ¼ inches apart and the slots are therefore located one and ¼ inches from one another.

The reference numeral 38 designates a flat rectangular plate which is provided with a pair of internally threaded bosses 40 which project upwardly beyond one surface of the plate 38 and which are spaced from one another a distance equal to the separation between the pairs of slots 34 and 36. The projecting portions of the bosses 40 are of a height approximately equal to the combined thicknesses of the plates 30 and 32 and the license tag 18. Screws 42 are also provided. These screws have a threaded portion 44 which engages the internal threads of the boss 40 and a nonthreaded, tapered end portion 46 which, when the screw is fully threaded into the boss 40, projects beyond the lower end of the plate 38 to embed itself in the leather strap 10 of the dog collar.

Either or both of the U-shaped members 20 and 22 may also be provided with lugs 48 on opposite edges of their side portions. These lugs 48 may be crimped to securely hold printed identifying material 50 and a protective sheet of plastic 52. For example, a small printed label of the type commonly used to provide a return address on an envelope and which gives the pet owner's name and address may be thus secured to the holder. It should also be noted that additional data may be stamped or printed on the outer face of the lower portion 28 of the U-shaped member 22 for either identification or advertising purposes.

The holder 16 may be installed on the collar by first positioning the plates 38 within the U-shaped member 22 with the bosses 40 projecting upwardly through the slots 36. The strap 10 is now inserted into the U-shaped member 22 with the strap lying between the plate 38 and the lower plate 24. It should be noted that the plate 38 and bosses 40 lie on the side of the strap 10 which is the outer surface of the collar when installed. The U-shaped member 22 is subsequently slid onto the U-shaped member 20 with the lower portion 24 passing between the strap 10 and the lower portion 28 of the U-shaped member 20 and with the lugs 26 overlying the portion 28. The upper portion 30 of the U-shaped member 20 passes over the upper portion 32 of the U-shaped member 22. The U-shaped member 20 is sufficiently flexible to snap over the upwardly projecting ends of the bosses 40 and these bosses are received in the slots 34. The U-shaped members 20 and 22 are now pushed together, the slots 34 and 36 permitting adjustment for different widths of straps 10. The license tag 18 is positioned on top of the upper surface 30 with its holes aligned with the upwardly projecting portions of the bosses 40. The screws 42 are now threaded into the bosses and, as they are tightened, they securely clamp the license tag 18 and the upper portions 30 and 32 of the U-shaped members 20 and 22 between the plate 38 and the heads of the screws 40. At the same time the lower, unthreaded portions 46 of the screws 40 are forced downwardly into the strap 10 thus tightly anchoring the assembly to the strap.

If the strap 10 is free of rivets or raised ornamentation, the holder 16 may also be installed by first assembling the U-shaped members 20 and 22 and the plate 38 and subsequently drawing the strap 10 through the space between the plate 38 and the lower portion 24. When the assembly has been moved to the desired position on the strap the license tag 18 may be positioned over the bosses 40, the members 20 and 22 pressed firmly together, and the screws 40 inserted and tightened to clamp the holder together and to affix it to the strap 10 of the collar.

It will be apparent that changes may be made in the preferred embodiment of my invention described above. Thus, for example, the bosses 40 may be omitted and suitable threaded holes provided in the plate 38 for receiving the screws 42. However, these bosses 40 facilitate the assembly of the holder and, where the members are made of lightweight aluminum, the bosses 40 provide adequate threads and eliminate the danger of stripping the threads which would be provided in the thin aluminum plate 38. It will also be apparent that while two screws are employed in the preferred embodiment, a single screw may be used and may be preferable where a license tag of different configuration is employed.

I claim:

1. A holder for securing a dog license tag or other identification to a dog collar, comprising: first and second U-shaped members, said members having interengaging means on one of their principal surfaces to join said members forming an open ended boxlike structure surrounding a portion of the collar, and each of said members having at least one hole in the other of the principal surfaces, said holes being aligned with one another; a flat plate received within said boxlike structure, lying between said collar and said other of said principal surfaces, and having at least one threaded opening aligned with said hole of said U-shaped members; and at least one screw retaining said license tag, passing through said holes of said U-shaped members, threaded into said opening in said plate, and having an end portion extending through said plate and penetrating into said collar.

2. A holder according to claim 1 wherein said interengaging means consists of downwardly and inwardly bent opposite side edge portions of the principal surface of one of said U-shaped members, said bent portions forming channels in which the corresponding principal surface of the other of said members is slideably received; and wherein said holes in said other principal surfaces of said U-shaped members are in the form of elongated slots, the arrangement permitting the width of said boxlike structure to be increased or decreased.

3. A holder according to claim 2 wherein said flat plate is provided with at least one upwardly projecting boss extending through the slots of said U-shaped members and through the mounting hole of said license tag, said boss having a threaded bore extending through said plate and said screw being received within said threaded bore.

4. A holder according to claim 3 wherein said U-shaped members are provided with a pair of slots, said flat plate is provided with a pair of bosses, the elements of each pair being separated from one another a distance equal to the separation of the mounting holes of said license tag.

5. A holder according to claim 2 wherein the side portion of at least one of said U-shaped members is provided with outwardly extending tab portions on opposite edges, said portions being adapted to be bent downwardly against said U-shaped member to secure printed identifying material to said holder.

6. A holder for securing a license tag to a dog collar, comprising: first and second U-shaped members each having parallel upper and lower principal surfaces, each having a pair of slots in its upper principal surface, the side edge portions of the lower principal surface of said first member being bent to form channels in which the lower principal surface of said second member is slideably received; a platelike member lying between the upper and lower surfaces of said U-shaped members; a pair of threaded bosses extending through and secured to said platelike member, said bosses projecting upwardly through said slots and through the mounting holes of the license tag; and a pair of screws threaded into said bosses, firmly clamping said license tag, upper principal surfaces and platelike member together, and said screws each having a lower portion extending below said platelike member and penetrating into said collar.